United States Patent [19]

O'Grady

[11] 4,069,849
[45] Jan. 24, 1978

[54] ARRANGEMENT FOR CUTTING CONTOURS IN A WORKPIECE

[75] Inventor: James Kenneth O'Grady, Toronto, Canada

[73] Assignee: The Black and Decker Manufacturing Company, Towson, Md.

[21] Appl. No.: 713,634

[22] Filed: Aug. 12, 1976

[51] Int. Cl.$^2$ .......................... B27C 5/10; B25H 1/00
[52] U.S. Cl. ............................. 144/134 D; 144/286 R
[58] Field of Search .......... 144/136 C, 136 R, 134 R, 144/134 D, 288 R, 288 C, 287, 2 R, 286 R, 286 A

[56] References Cited

U.S. PATENT DOCUMENTS

| | | | |
|---|---|---|---|
| 2,541,508 | 2/1951 | Fleming | 144/286 R |
| 2,609,018 | 9/1952 | Bjorklund | 144/134 D |
| 2,751,945 | 6/1956 | Beach | 144/136 C |
| 2,752,961 | 7/1956 | Melgaard | 144/136 C |

*Primary Examiner*—Othell M. Simpson
*Assistant Examiner*—W. D. Bray
*Attorney, Agent, or Firm*—Walter Ottesen; Edward D. Murphy; Leonard Bloom

[57] ABSTRACT

The invention is directed to an arrangement for cutting contours in a workpiece with a router and includes a supporting structure and a pair of elongated vise members mounted on the supporting structure. The vise members are disposed in side by side relation to each other with at least one of the vise members defining a substantially smooth upper surface upon which the workpiece can be placed. At least one of the vise members is mounted on the supporting structure so as to be movable relative to the other one of the vise members. An elongated fence member adapted for insertion between the vise members is also provided. A clamping arrangement is included for adjusting the vise members with respect to each other to clamp the fence member therebetween. A mounting structure accommodates a router and is mounted on the fence member so that the mounting plate, the fence member and the upper surface of the workbench conjointly define a path for passing the workpiece therealong. The mounting structure is configured to receive the router in such a manner that the cutting bit of the router extends into the path along which the workpiece is moved.

22 Claims, 5 Drawing Figures

ARRANGEMENT FOR CUTTING CONTOURS IN A WORKPIECE

BACKGROUND OF THE INVENTION

The invention relates to an arrangement for cutting contours in a workpiece.

Arrangements for cutting contours in a workpiece are suggested by the prior art as shown, for example, by U.S. Pat. No. 1,506,154. In this patent, and more particularly in FIG. 4 thereof, a motor assembly is clamped in the vise with the assembly itself including a structure upon which the workpiece is passed along for the purpose of cutting a contour therein. The motor for driving the routing bit is an integral portion of the assembly as is the adjustable fence member for locating the contour to be cut with respect to the edge of the workpiece. Such an arrangement is not amenable to quick assembly and disassembly and must always be transported to the work site as a single unit which can be quite cumbersome for the operator. Also, the operator is not aided by the assembly in holding down the workpiece as he feeds it through the cutting bit.

Prior art devices of this kind are undoubtedly expensive to manufacture and are not easily transportable.

SUMMARY OF THE INVENTION

Accordingly, it is an object of my invention to provide an arrangement for cutting contours in a workpiece with a router which can be assembled with pieces having a simple configuration and are relatively inexpensive to produce.

It is another object of my invention to provide such an arrangement which is simple to use and wherein an enclosed path is provided for assisting the operator in guiding the workpiece into the cutting bit of the router.

It is still another object of my invention to provide an arrangement for cutting contours in a workpiece wherein both the height and depth of the path as well as the cutting depth of the router bit are easily adjustable.

The arrangement for cutting contours in a workpiece according to my invention is suitable for use with a router and a workbench having a pair of mutually clampable elongated vise members disposed in side by side relation to each other. At least one of the vise members defines a substantially smooth upper surface upon which the workpiece can be placed and moved along during the cutting operation. According to a feature of this embodiment of the arrangement according to my invention I provide an elongated fence member which is adapted for insertion between the vise members. Also, a mounting structure in the form of a mounting plate is mounted on the fence member so as to extend out over the smooth upper surface of the vise member when the fence member is clamped between the vise members. The mounting plate, the fence member and the smooth upper surface of the vise member conjointly define a channel-like path for passing the workpiece therealong. In addition, the mounting structure includes mounting means for receiving the router thereon so as to cause the router bit to extend into the above-mentioned path.

In another embodiment of my invention for cutting contours in a workpiece with a router, I include as a feature of my invention a supporting structure as well as pair of elongated vise members mounted on the supporting structure and disposed in a side by side relation to each other. At least one of the vise members defines a substantially smooth upper surface upon which the workpiece can be placed and at least one of the vise members is mounted on the supporting structure so as to be movable relative to the other one of the vise members. The elongated fence member is adapted for insertion between these vise members and clamping means are provided for adjusting the movable vise member toward or away from the other one of the vise members so as to clamp the fence member therebetween. It is possible to clamp the fence member at any convenient height. Preferably, the fence member is clamped at a height corresponding to the thickness of the workpiece so that the mounting plate will extend out over the smooth upper surface of the workbench at this height. The mounting plate, the fence member and the smooth upper surface of the vise member then conjointly define a path for passing the workpiece therealong. The mounting structure includes mounting means for receiving the router in such a manner that the cutting bit of the router extends into the path.

If desired and according to still another embodiment of my invention, the router itself can constitute part of the arrangement and elevation adjusting means for adjusting the elevation of the cutting bit of the router with respect to the upper surface can also be included.

The arrangement for cutting contours in a workpiece according to the invention is especially suitable for use with a workbench of the kind described in the co-pending application Ser. No. 277,124 of Ronald Price Hickman filed Aug. 1, 1972, and now abandoned which is an improvement of his basic workbench disclosed in Pat. No. 3,615,087. The workbench disclosed in the above-mentioned patent application and patent includes elongated vise members having a smooth upper surface and are especially suitable for clamping the fence member therein and coacting with the fence member.

The workbench corresponding to the workbench disclosed in U.S. Pat. No. 3,615,087 as modified according to the above-mentioned co-pending application is available in the United States and abroad and is manufactured and sold by The Black and Decker Manufacturing Company of Towson, Md. as the "WORKMATE" All-Purpose Work Center and Vise.

The objectives and advantages of my invention will become more apparent from a consideration of the detailed description to follow taken in conjunction with the drawing annexed hereto.

DESCRIPTION OF THE PREFERRED EMBODIMENTS OF THE INVENTION

Figure 1:
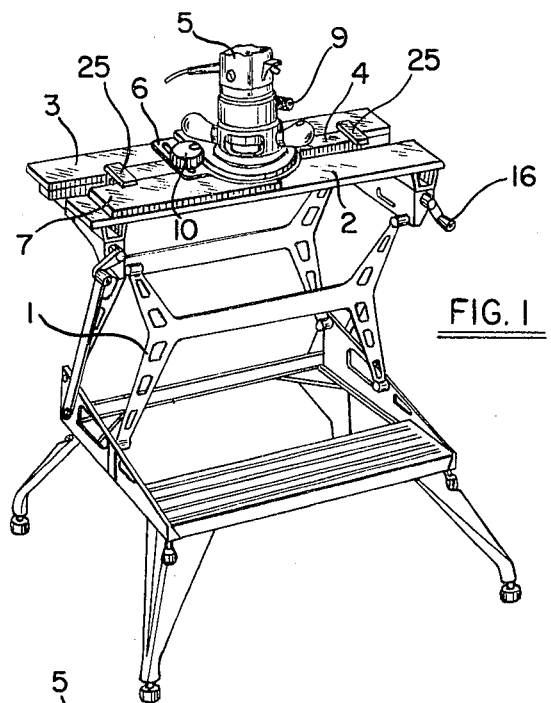
FIG. 1 is a perspective view of the arrangement for cutting contours in a workpiece according to the invention.

FIG. 1 shows a workbench having a supporting structure 1 and elongated vise member 2 and 3 mounted on the supporting structure 1. An elongated fence member 4 is clamped between the elongated vise members 2 and 3 and the mounting structure in the form of a plate-like member 6 is secured to the top end of the fence member 4. A router 5 is mounted upon the plate-like member 6.

Figure 2:
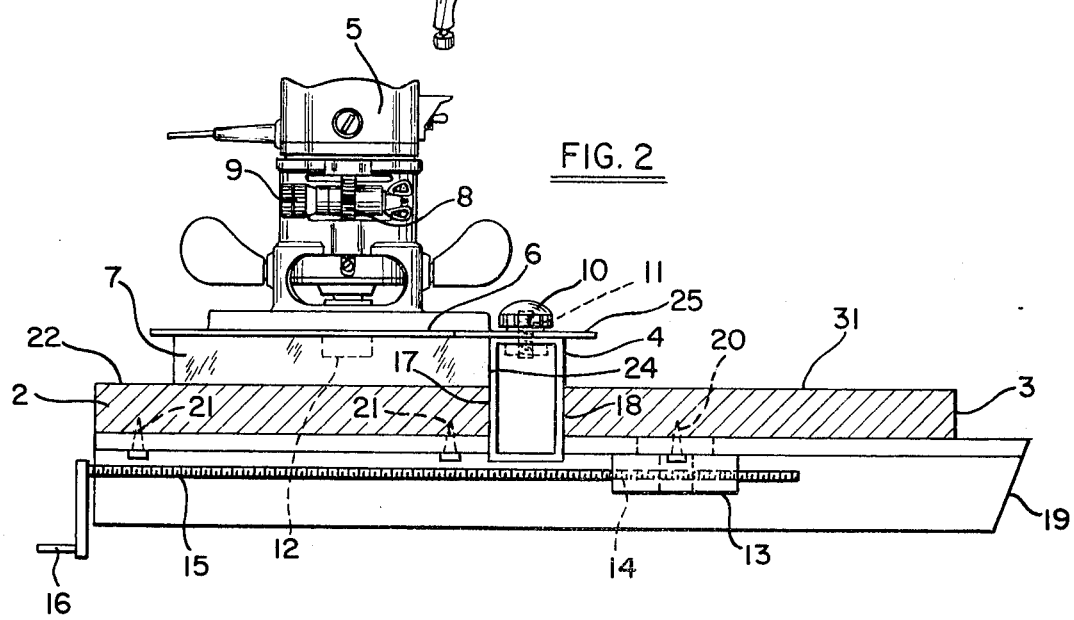
FIG. 2 is an elevation view taken along line 2—2 of FIG. 3 and shows the arrangement according to the invention receiving a workpiece for cutting a contour therein.

Referring now to FIG. 2, the work surfaces 22 and 31 of the workbench are defined by the elongated vise member 2 and 3, respectively. The vise members 2 and 3 have opposed vertical surfaces 17 and 18, respectively, which can be drawn towards one another from their spaced apart positions to clamp the elongated fence member 4 as shown. Each end of the front elongated vise member 2 is rigidly connected to a horizontal channel-like member 19 by means of a pair of screws 21. The member 19 is provided with a longitudinal slot for slideably engaging slide member 13 attached to the movable vise member 3 by means by a screw 20. The slide member 13 has a screw threaded bore 14 formed therein. The threaded bore 14 coacts with an externally screw threaded rod 15 which, in turn, is actuated by crank handle 16. By rotating the rod 15, the slide member 13 and therefore vise member 3 are caused to move towards or away from the front elongated vise member 2. By moving the movable elongated vise member 3 towards the fixed vise member 2, the elongated fence member 4 is clamped therebetween.

As can be seen in FIG. 2, the mounting structure for mounting the router 5 is in the form of plate-like member 6, the elongated fence member 4 and the top surface of the vise member 2 conjointly define a path for passing the workpiece 7 therealong.

The depth at which the router will penetrate the workpiece 7 for contouring the same can be adjusted by elevation adjustment means for adjusting the elevation of the bit 12 with respect to the upper surface 22 of vise member 2. The elevation adjustment means can be in the form of a rack 8 and pinion 9 of the router 5. The router 5 can be, for example, a number 3310 "CYCLONE" router manufactured and sold by The Black and Decker Manufacturing Company of Towson, Md.

Figure 3:
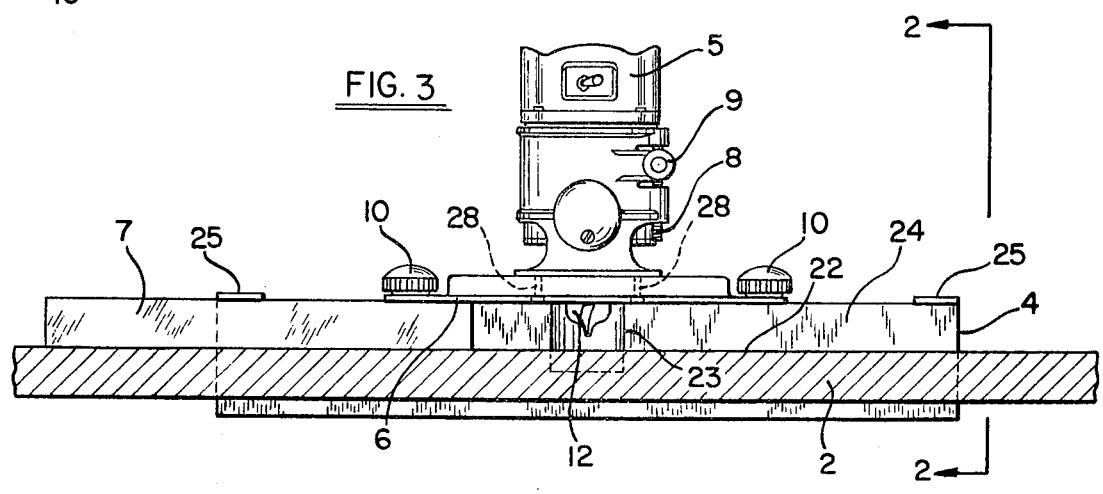
FIG. 3 is a front view of the arrangement shown in FIG. 2.

FIG. 3 shows a front elevation view of the arrangement according to the invention. The opening 23 in the elongated fence member 4 is provided for accommodating at least a portion of the router bit 12 therein in recessed relation to the fence surface 24 thereby enabling the workpiece to be chamfered at an edge thereof as it is passed along the path conjointly defined by plate-like member 6, fence surface 24 and bench surface 22.

Figure 4:
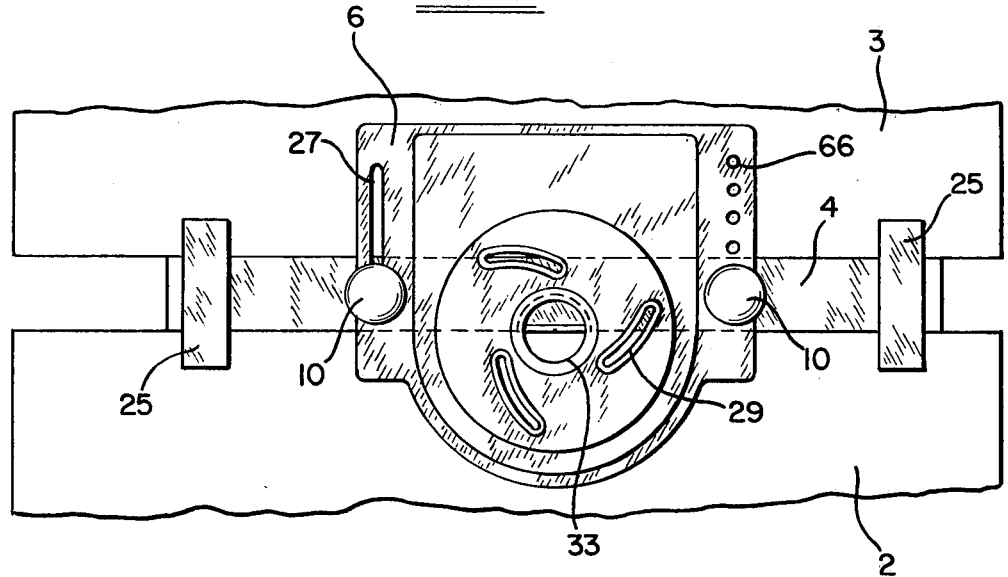
FIG. 4 is a plan view of the arrangement shown in FIG. 3 without the router mounted structure. This view shows the details of the adjustment means for enabling the operator to move the router transversely with respect to the fence member.

FIG. 4 is a plan view of the arrangement according to the invention and shows transverse adjustment means for transversely adjusting, in a direction transverse to the fence member 4, the location in the above-mentioned workpiece path at which the router bit 12 is to contour the workpiece 7. The transverse adjustment means includes at least two studs 11 extending upwardly from the top of the elongated fence member 4. The stud 11 is shown in phantom outline in FIG. 2. A plurality of apertures 26 formed in the plate-like member 6 are arranged in a row along one of its edges. A slot 27 is also formed in the member 6 and arranged along the other one of the edges thereof. The apertures 26 and slot 27 are dimensioned to be engageable with the studs 11 thereby enabling the operator to manually position the plate-like member 6 with respect to the fence member 4 to adjust the location of the bit 12 of the router 5 in the path of the workpiece in the direction transverse to the longitudinal dimension of the fence member 4. Locking knobs 10 are provided for coacting with the studs 11 for holding the plate-like member 6 to the fence member 4 in the position selected by the operator.

The combination of apertures 26 and slot 27 has been found to facilitate an excellent adjustment of the plate-like member 6 with respect to the fence member 4. The member 6 can pivot about the stud 11 and still move somewhat in slot 27 until secured by the operator by tightening locking knob 10.

Referring to FIGS. 3 and 4, the router 5 is mounted to the plate-like member 6 with the aid of router mounting means which can include slots 29 formed in the plate-like member 6. If desired, these slots could extend in a radial direction. The bolts 28 of the router penetrate the slots 29 when the router 5 is mounted. The router 5 is secured with the aid of bolts 28 which threadably engage the router base. The opening 33 in plate-like member 6 shown in FIG. 4 is provided for the router bit 12 and/or its drive shaft so that the router bit 12 can extend into the path of the workpiece 7 when the router 5 is secured to the plate-like member 6.

Figure 5:
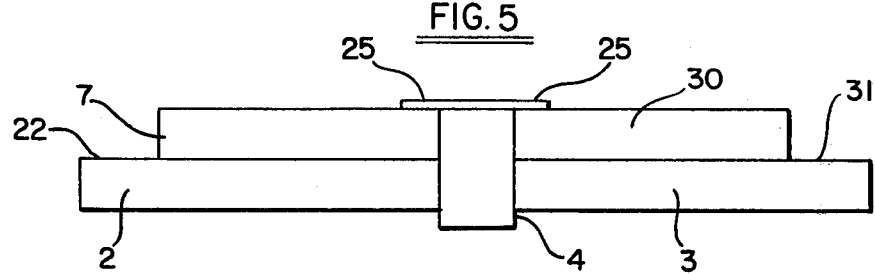
FIG. 5 shows how the flanges on the fence member can be utilized to position the fence member in the bench between the clampable vise members thereof.

FIG. 5 is a schematic end view showing how the fence member 4 can be accuratedly positioned between the vise members 2 and 3 for receiving a workpiece having a given height. The workpiece 7 to be routed is placed for example on surface 22 of vise member 2 and extends beyond the ends of the fence member 4 so that the flanges 25 at opposite ends of the fence member 4 rest thereon. On the other vise member 3, a like piece 30 corresponding in height to workpiece 7 is placed on the surface 31 so that it too supports the fence member 4 at the flanges 25 extending out over the surface of vise member 3. With the fence member in position as shown in FIG. 5, the vise member 3 can be drawn toward vise member 2 to clamp the fence member 4 in place. Because both the workpiece 7 and the extra piece 30 evenly hold the fence member 4 in elevation, the fence member 4 is evenly clamped ready to receive the plate-like member 6 and router 5 thereon. Or, if desired, the plate-like member 6 and router can be mounted to the fence before the fence is positioned and clamped between the vise members 2 and 3. The height of the path for the workpiece 7 then corresponds to the height of the workpiece 7 itself.

The fence member 4 can be formed as an extruded member so that in lieu of the tab-like flanges 25, the flanges can run the entire length of the fence member.

I claim:

1. An arrangement for cutting contours in a workpiece with a router comprising:

a supporting structure;

a pair of elongated vise members mounted on said supporting structure and disposed in side by side relation to each other, at least one of said vise members defining a substantially smooth upper surface upon which the workpiece can be placed and at least one of said vise members being mounted on said supporting structure so as to be movable relative to the other one of said vise members;

an elongated fence member adapted for insertion between said vise members;

clamping means for adjusting said one movable vise member toward or away from the other one of said vise members to clamp said fence member therebetween;

a mounting structure mounted on said fence member so as to extend out over said upper surface when said fence member is clamped between said vise members; said mounting structure, said fence member and said upper surface conjointly defining a path for passing the workpiece therealong; and, router mounting means for mounting the router on said mounting structure so as to cause the cutting bit of the router to extend into said path.

2. The arrangement of claim 1, the other one of said vise members likewise defining a substantially smooth upper surface, said vise members being mounted on said supporting structure so as to cause said upper surfaces to lie in a common plane, said fence member including flange means arranged thereon so as to extend out over said surfaces when said fence member is inserted between said vise members.

3. The arrangement of claim 1 comprising: transverse adjustment means for adjusting the location of said bit in said path in a direction transverse to said fence member.

4. The arrangement of claim 3, said fence member having an opening formed therein for accommodating at least a portion of the bit of the router in recessed relation to the fence surface of said fence member whereby the workpiece can be chamfered at an edge thereof when passed along said path.

5. The arrangement of claim 3, said mounting structure being a plate-like member having respective edges extending transversely to the longitudinal dimension of said fence member; said transverse adjustment means comprising:

at least two studs extending upwardly from the top of said elongated fence member;

a plurality of apertures formed in said plate-like member and arranged in a row along one of said edges;

a slot formed in said plate-like member and arranged along the other one of said edges thereof; said apertures and said slot being dimensioned to be engagable with said studs thereby enabling the operator to manually position the plate-like member with respect to said fence member to adjust the location of the bit of said router in said path in a direction transverse to said longitudinal dimension of said fence member; and, means for coacting with said studs for holding said plate-like member to said fence member in the position selected by the operator.

6. The arrangement of claim 5, said fence member having an opening formed therein for accommodating at least a portion of the bit of the router in recessed relation to the fence surface of said fence member whereby the workpiece can be chamfered at an edge thereof when passed along said path.

7. The arrangement of claim 6, the other one of said vise members likewise defining a substantially smooth upper surface, said vise members being mounted on said supporting structure so as to cause said upper surfaces to lie in a common plane, said fence member including flange means arranged thereon so as to extend out over said surfaces when said fence member is inserted between said vise members.

8. An arrangement for cutting contours in a workpiece comprising:

a supporting structure;

a pair of elongated vise members mounted on said supporting structure and disposed in side by side relation to each other, at least one of said vise members defining a substantially smooth upper surface upon which the workpiece can be placed and at least one of said vise members being mounted on said supporting structure so as to be movable relative to the other one of said vise members;

an elongated fence member adapted for insertion between said vise members;

clamping means for adjusting said one movable vise member toward or away from the other one of said vise members to clamp said fence member therebetween;

a mounting structure mounted on said fence member so as to extend out over said upper surface when said fence member is clamped between said vise members; said mounting plate, said fence member and said upper surface conjointly defining a path for passing a workpiece therealong; and, a router mounted on said mounting structure so as to cause the bit of said router to extend into said path.

9. The arrangement of claim 8, the other one of said vise members likewise defining a substantially smooth upper surface, said vise members being mounted on said supporting structure so as to cause said upper surfaces to lie in a common plane, said fence member including flange means arranged thereon so as to extend out over said surfaces when said fence member is inserted between said vise members.

10. The arrangement of claim 8 comprising: elevation adjustment means for adjusting the elevation of said bit with respect to said upper surface.

11. The arrangement of claim 10 comprising: transverse adjustment means for adjusting the location of said bit in said path in a direction transverse to said fence member.

12. The arrangement of claim 11, said fence member having an opening formed therein for accommodating at least a portion of the bit of the router in recessed relation to the fence surface of said fence member whereby the workpiece can be chamfered at an edge thereof when passed along said path.

13. The arrangement of claim 12, said mounting structure being a plate-like member having respective edges extending transversely to the longitudinal dimension of said fence member; said transverse adjustment means comprising:

at least two studs extending upwardly from the top of said elongated fence member, a plurality of apertures formed in said plate-like member and arranged in a row along one of said edges;

a slot formed in said plate-like member and arranged along the other one of said edges thereof; said apertures and said slot being dimensioned to be engagable with said studs thereby enabling the operator to manually position the plate-like member with respect to said fence member to adjust the location of the bit of said router in said path in a direction transverse to the longitudinal dimension of said fence member; and, means for coacting with said studs for holding said plate-like member to said fence member in the position selected by the operator.

14. The arrangement of claim 13, said fence member having an opening formed therein for accommodating at least a portion of the bit of the router in recessed relation to the fence surface of said fence member whereby the workpiece can be chamfered at an edge thereof when passed along said path.

15. The arrangement of claim 14, the other one of said vise members likewise defining a substantially smooth upper surface, said vise members being mounted on said supporting structure so as to cause said upper surfaces to lie in a common plane, said fence member including flange means arranged thereon so as to extend out over said surfaces when said fence member is inserted between said vise members.

16. An arrangement for cutting contours in a workpiece with a router and a workbench having a pair of mutually clampable elongated vise members disposed in side by side relation to each other, at least one of the vise members defining a substantially smooth upper surface upon which the workpiece can be placed, the arrangement comprising:

an elongated fence member adapted for insertion between the vise members; and, a mounting structure mounted on said fence member so as to extend out over the smooth upper surface of the vise member when the fence member is clamped between the vise members; said mounting plate, said fence member and the smooth upper surface of the vise member conjointly defining a path for passing the workpiece therealong; said mounting structure including mounting means for receiving the router thereon so as to cause the bit of the router to extend into said path.

17. The arrangement of claim 16, the other one of said vise members likewise defining a substantially smooth upper surface, said vise members being mounted on said supporting structure so as to cause said upper surfaces to lie in a common plane, said fence member including flange means arranged thereon so as to extend out over said surfaces when said fence member is inserted between said vise members.

18. The arrangement of claim 16 comprising: transverse adjustment means for adjusting the location of said bit in said path in a direction transverse to said fence member.

19. The arrangement of claim 18, said fence member having an opening formed therein for accommodating at least a portion of the bit of the router in recessed relation to the fence surface of said fence member whereby the workpiece can be chamfered at an edge thereof when passed along said path.

20. The arrangement of claim 19, said mounting structure being a plate-like member having respective edges extending transversely the longitudinal dimension of said fence member; said transverse adjustment means comprising:

at least two studs extending upwardly from the top of said elongated fence member, a plurality of apertures formed in said plate-like member and arranged in a row along one of said edges;

a slot formed in said plate-like member and arranged along the other one of said edges thereof; said apertures and said slot being dimensioned to be engagable with said studs thereby enabling the operator to manually position the plate-like member with respect to said fence member to adjust the location of the bit of said router in said path in a direction transverse to the longitudinal dimension of said fence member; and, means for coacting with said studs for holding said plate-like member to said fence member in the position selected by the operator.

21. The arrangement of claim 20, said fence member having an opening formed therein for accommodating at least a portion of the bit of the router in recessed relation to the fence surface of said fence member whereby the workpiece can be chamfered at an edge thereof when passed along said path.

22. The arrangement of claim 21, the other one of said vise members likewise defining a substantially smooth upper surface, said vise members being mounted on said supporting structure so as to cause said upper surfaces to lie in a common plane, said fence member including flange means arranged thereon so as to extend out over said surfaces when said fence member is inserted between said vise members.

* * * * *